(12) United States Patent
Lee et al.

(10) Patent No.: US 8,063,355 B2
(45) Date of Patent: Nov. 22, 2011

(54) REFLECTIVE MULTI-TURN ENCODERS WITH DIFFERENT LIGHT SENSING SYSTEMS

(75) Inventors: Sze Kuang Lee, Penang (MY); Yee Loong Chin, Lahat (MY); Weng Fei Wong, Gelugor (MY)

(73) Assignee: Avago Technologies Limited, Singapore (SG)

( * ) Notice: Subject to any disclaimer, the term of this patent is extended or adjusted under 35 U.S.C. 154(b) by 367 days.

(21) Appl. No.: 12/350,932

(22) Filed: Jan. 8, 2009

(65) Prior Publication Data

US 2010/0171029 A1   Jul. 8, 2010

(51) Int. Cl.
 *G01D 5/34* (2006.01)
(52) U.S. Cl. .................................................. 250/231.14
(58) Field of Classification Search .. 250/231.1–231.18, 250/221, 233, 234; 33/1 PT, 1 N, 707; 341/13, 341/14; 702/165, 163; 365/138
 See application file for complete search history.

(56) References Cited

U.S. PATENT DOCUMENTS

| | | | | |
|---|---|---|---|---|
| 4,409,663 A | * | 10/1983 | Becker et al. | 702/165 |
| 4,849,621 A | * | 7/1989 | Yanase et al. | 250/214 PR |
| 4,928,008 A | * | 5/1990 | Huggins et al. | 250/231.1 |
| 5,640,007 A | * | 6/1997 | Talbott et al. | 250/231.15 |
| 5,900,930 A | * | 5/1999 | Simon et al. | 356/138 |
| 6,564,168 B1 | * | 5/2003 | Hasser | 702/163 |
| 6,683,545 B2 | | 1/2004 | Strasser | |
| 7,017,274 B2 | | 3/2006 | Stobbe | |
| 7,544,925 B2 | * | 6/2009 | Mizuno et al. | 250/231.18 |
| 2002/0014581 A1 | * | 2/2002 | Yamamoto et al. | 250/231.13 |
| 2002/0063202 A1 | * | 5/2002 | Simon et al. | 250/231.13 |

FOREIGN PATENT DOCUMENTS

JP    1047996    2/1989

OTHER PUBLICATIONS

"Multi-Turn Absolute Encoder Sensor for Measurement and Control", Nikon Corporation, Sep. 2, 2008.

* cited by examiner

*Primary Examiner* — Georgia Y Epps
*Assistant Examiner* — Renee Naphas

(57) ABSTRACT

Disclosed herein are a number of different embodiments of reflective multi-turn optical encoders with different light sensing systems. Three different basic configurations of reflective multi-turn optical encoder light sensing systems are disclosed herein: (a) optical encoders employing multiple arrays of light detectors; (b) optical encoders employing multiple arrays of stacked die light sensors, and (c) optical encoders employing variable tone density light sensing systems.

27 Claims, 11 Drawing Sheets

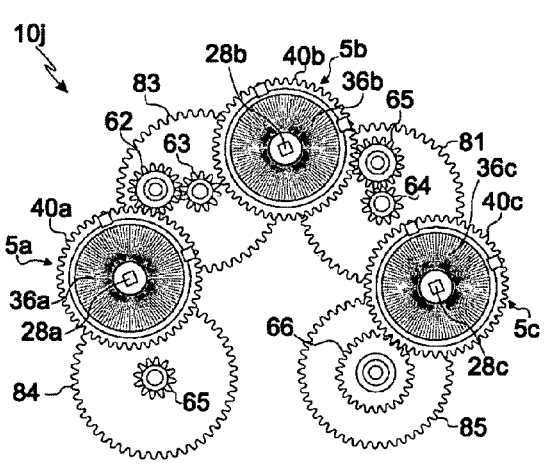
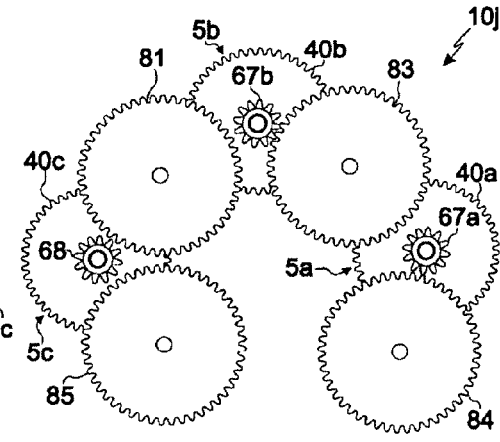
FIG. 13(a)　　FIG. 13(b)
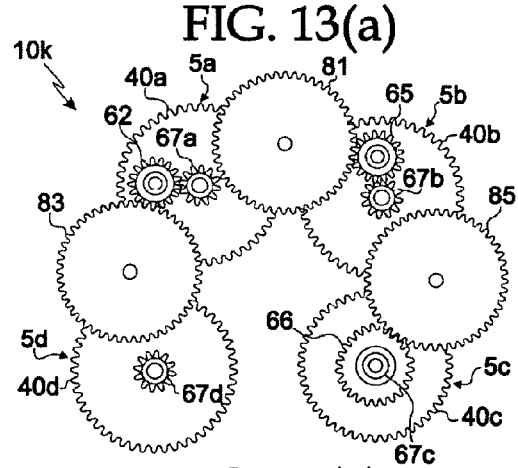
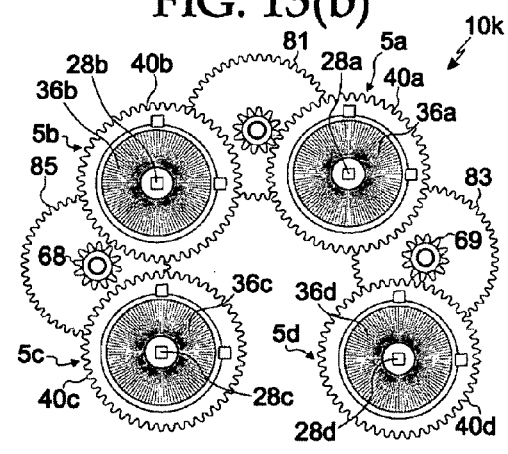
FIG. 14(a)　　FIG. 14(b)
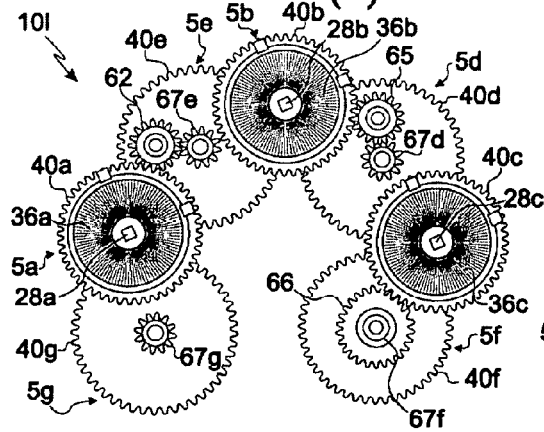
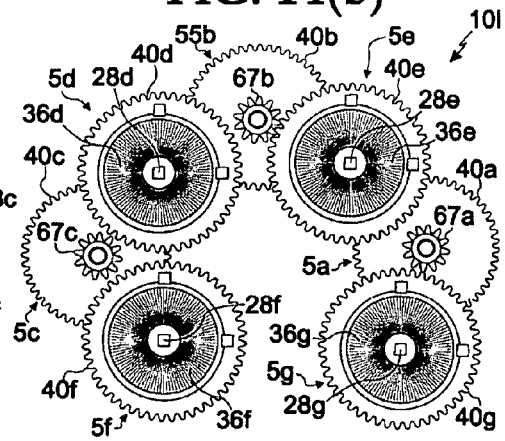
FIG. 15(a)　　FIG. 15(b)

REFLECTIVE MULTI-TURN ENCODERS WITH DIFFERENT LIGHT SENSING SYSTEMS

FIELD OF THE INVENTION

Various embodiments of the invention described herein relate to the field of optical encoders, and components, devices, systems and methods associated therewith.

BACKGROUND

Multi-turn optical encoders are employed in many different applications. The mechanical construction of multi-turn optical encoders is usually based on gear train design, where gears with openings or holes must be provided for light to pass through the gears for subsequent collimation, reflection or detection. The openings or holes often prevent the gears in optical encoders from being packed very close to one another, and also limit the precision that may be obtained for injection-molded gears. In addition, substrates such as printed circuit boards, flexible cables and the like are typically required on both sides of the gear train to impart the required mechanical integrity to such optical encoders. Finally, multi-turn optical encoders are typically incapable of sensing partial revolutions of the constituent disks or gears disposed therein.

Magnetic multi-turn encoders are also known in the art, but are easily affected by external magnetic fields and cannot operate at very high temperatures without being demagnetized. Such characteristics obviously limit the type and number of applications in which magnetic multi-turn encoders may be used.

What is needed is a multi-turn encoder that may be made more compact, manufactured at lower cost and with higher precision, and permit partial revolutions of constituent disks to be sensed and measured.

SUMMARY

In some embodiments, there is provided a reflective multi-turn optical encoder sub-module comprising a gear having an outer geared periphery and an upper surface having no apertures or holes disposed therethrough, a geared rotatable shaft attached to an underside of the first gear, an optically reflective first area disposed on a first portion of the upper surface, an optically substantially non-reflective second area disposed on a second portion of the upper surface, and a substrate disposed above and opposing the upper surface, the substrate comprising a light emitter and first and second arrays of light detectors disposed and configured on the substrate such that first and second output signals provided by the first and second arrays of light detectors are out of phase with respect to one another by a predetermined phase difference, and wherein the gear and the substrate are configured and arranged respecting one another such that at least portions of the light emitted by the light emitter and incident on the first area are reflected towards at least portions of the first and second arrays of light detectors for detection thereby as the gear and the substrate rotate in respect of one another, and at least portions of the light emitted by the light emitter and incident on the second area are substantially not reflected from the second area and are not detected by the first or second arrays of light detectors as the gear and the substrate rotate in respect of one another.

In another embodiment, there is provided a reflective multi-turn optical encoder sub-module comprising a gear having an outer geared periphery and an upper surface having no apertures or holes disposed therethrough, a geared rotatable shaft attached to an underside of the first gear, an optically reflective first area disposed on a first portion of the upper surface, an optically substantially non-reflective second area disposed on a second portion of the upper surface, and a stacked die substrate disposed above and opposing the upper surface, the substrate comprising a light emitter and having first and second arrays of light detectors disposed and configured thereon such that first and second output signals provided by the first and second arrays of light detectors are out of phase with respect to one another by a predetermined phase difference, and wherein the gear and the substrate are configured and arranged respecting one another such that at least portions of the light emitted by the light emitter and incident on the first area are reflected towards at least portions of the first and second arrays of light detectors for detection thereby as the gear and the substrate rotate in respect of one another, and at least portions of the light emitted by the light emitter and incident on the second area are substantially not reflected from the second area and are not detected by the first and second arrays of light detectors as the gear and the substrate rotate in respect of one another.

In still another embodiment, there is provided a reflective multi-turn optical encoder sub-module comprising a gear having an outer geared periphery and an upper surface having no apertures or holes disposed therethrough, a geared rotatable shaft attached to an underside of the first gear, an optically reflective variable tone density codewheel disposed on, in or near the upper surface, and a substrate disposed above and opposing the upper surface, the substrate comprising a light emitter and at least first and second light detectors disposed and configured on the substrate such that first and second output signals provided thereby are out of phase with respect to one another by a predetermined phase difference, and wherein the gear and the substrate are configured and arranged respecting one another such that at least portions of the light emitted by the light emitter and incident on the optically reflective variable tone density codewheel are reflected therefrom towards the first and second light detectors for detection thereby as the gear and the substrate rotate in respect of one another.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

FIGS. 2(a) through 5(b) show various views of different embodiments of multiple light detector reflective multi-turn optical encoders;

FIGS. 7(a) through 10(b) show various views of different embodiments of stacked die sensing reflective multi-turn optical encoders;

FIGS. 12(a) through 15(b) show various views of different embodiments of variable tone density sensing reflective multi-turn optical encoders;

The drawings are not necessarily to scale. Like numbers refer to like parts or steps throughout the drawings, unless otherwise noted.

DETAILED DESCRIPTIONS OF SOME PREFERRED EMBODIMENTS

Disclosed herein are a number of different embodiments of reflective multi-turn optical encoders with different light sensing systems. Three different basic configurations of reflective multi-turn optical encoder light sensing systems are disclosed herein: (a) optical encoders employing multiple arrays of light detectors; (b) optical encoders employing multiple arrays of stacked die light sensors, and (c) optical encoders employing variable tone density light sensing systems.

Figure 1A:
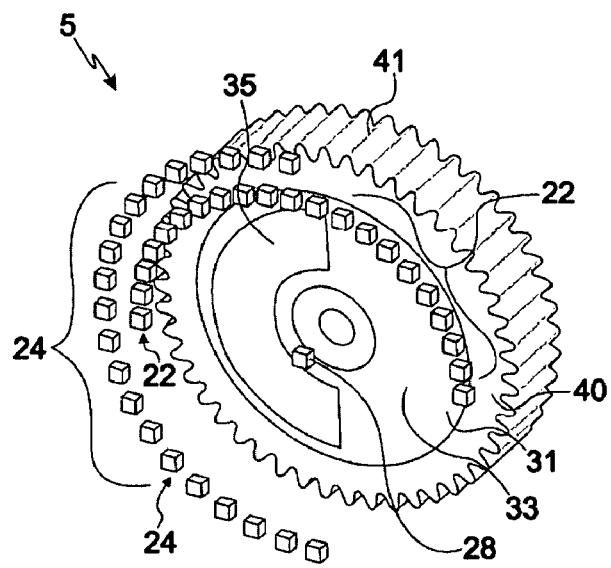
FIGS. 1(a) through 1(c) show perspective, top and side views, respectively, of one embodiment of sub-module 5 comprising multiple light detectors arranged along circularly-shaped tracks.
Figure 1B:
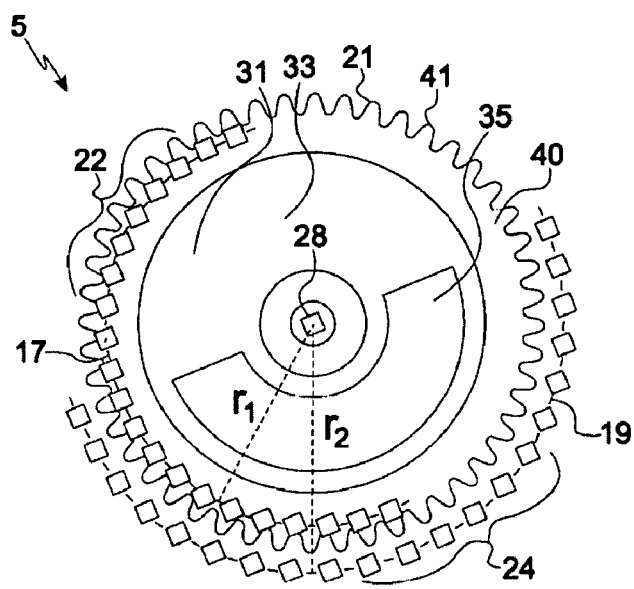
Figure 1C:
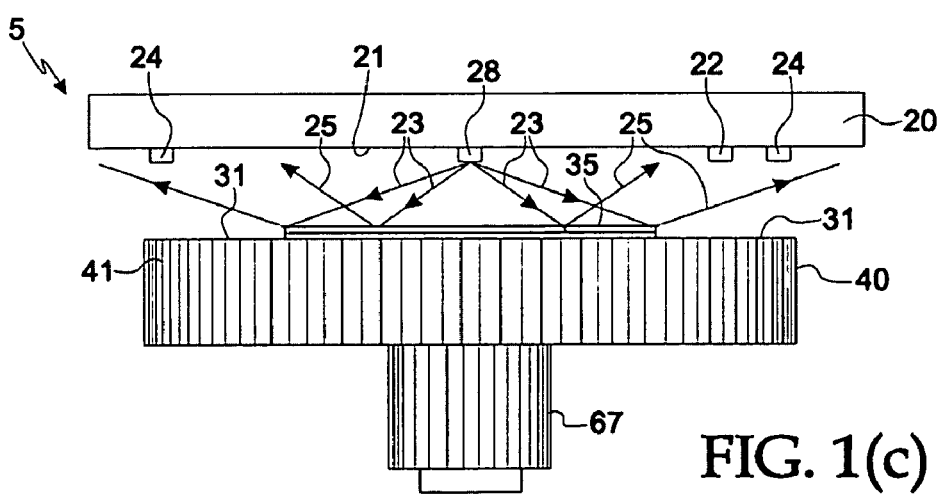

Referring now to FIGS. 1(a) through 1(c), there is shown one embodiment of a portion or sub-module 5 of a multiple detector reflective multi-turn optical encoder module 10 (not shown in FIGS. 1(a) through 1(c), but discussed in detail below in connection with FIGS. 2(a) through 5(b)), where optically reflected light rays or beams are sensed by multiple light detectors arranged in arrays that are employed to sense the movement of gear 40, and thereby sense and record the rotation of an associated pinion (not shown in FIGS. 1(a) through 1(c)). To sense and record the rotation of gear 40, optically reflective first area 35 is formed in or on, or attached to, upper surface 31 of gear 40, and emitter 28 and multiple light detectors arranged in arrays 22 and 24 are placed facing optically reflective first area 35. FIGS. 1(a) through 1(c) show the optical configuration and coupling of sub-module 5 between gear 40, emitter 28, light detector arrays 22 and 24, and optically reflective first area or reflective code disk 35 and gear, where the plane defined by upper surface 31 is substantially parallel to the plane defined by lower surface 21 of substrate 20.

Continuing to refer to FIGS. 1(a) through 1(c), gear 40 has outer geared periphery 41, and upper surface 31 of gear 40 has no apertures or holes disposed therethrough. Geared rotatable shaft 67 is attached to or disposed on or in underside 37 of gear 40. Shaft 67 is caused to turn through the action of a matingly engaging a different shaft (not shown in FIGS. 1(a) through 1(c)), the number of revolutions turned of which, or the absolute position of which, are to be determined.

Optically reflective first area 35 is disposed on or in, or formed into or on, a first portion of upper surface 31, while an optically substantially non-reflective second area 33 is disposed on or in, or formed into or on, a second portion of upper surface 31. Substrate 20 is operably disposed above and opposes upper surface 31. Note that optically reflective first area 35 need not be doughnut-, disk- or ring-shaped, and may assume any suitable shape configured to reflect light therefrom which, in conjunction with the particular geometries of arrays 22 and 24 that have been selected, produces suitable output signals from light detector arrays 22 and 24. In the embodiment shown in FIGS. 1(a) through 1(c), substrate 20 comprises light emitter 28 and first and second arrays of light detectors 22 and 24 arranged along first and second tracks 17 and 19 disposed along first and second diameters corresponding to first and second radii $r_1$ and $r_2$, respectively. First radius $r_1$ is shorter than second radius $r_2$.

In FIGS. 1(a) through 1(c), gear 40 and substrate 20 are configured and arranged respecting one another such that at least portions of light 23 emitted by light emitter 28 and incident on first area 35 form reflected light beams 25 which are directed towards at least portions of first and second arrays of light detectors 22 and 24 for detection thereby as gear 40 and substrate 20 rotate in respect of one another. In addition, at least portions of light 23 emitted by light emitter 28 and incident on second area 33 are substantially not reflected from second area 33 and are consequently not detected by first or second arrays of light detectors 22 and 24 as gear 40 and substrate 20 rotate in respect of one another.

As further shown in the embodiment illustrated in FIGS. 1(b) and 1(c), at least portions of first and second circular tracks 17 and 19 radially overlap one another through a common swept angle or common radii, while other portions of first and second tracks 17 and 19 do not radially overlap and are radially offset from one another. In one embodiment, approximately half of each of tracks 17 and 19 is occupied by individual light detectors forming arrays 22 and 24, which may be photodiodes, photodetectors, or any other suitable light-sensing device. In the embodiment of sub-module 5 shown in FIGS. 1(a) through 1(c), twenty individual light detectors are evenly spaced along each of tracks 17 and 19. Many numbers, spacings and configurations of the individual light detectors forming arrays 22 and 24, and of arrays 22 and 24, other than those shown in FIGS. 1(a) through 5(b) are, however, also contemplated. For example, the individual light detectors of arrays 22 and 24 need not be disposed along an arc or circular path, but instead may be arranged according to other geometries or areal patterns on substrate 20. Such patterns or geometries of arrays 22 and 24 comprising individual light detectors may be interleaved with one another, overlap with one another, be staggered in respect of one another, be disposed at varying or overlapping radii, and so on. In some embodiments, the individual light detectors of arrays 22 and 24 may be disposed and located on substrate 20 so that output signals from the arrays assume desired morphologies, such as a smoothly-varying sinusoidal curves, triangular curves, squared or blunted curves, customized output signals, or any other desired output signal shape determined by the areal pattern or array geometries. In other embodiments, the light detectors in arrays 22 and 24 are arranged along circular paths that are defined by staggered and interleaved arrays 22 and 24 having light detectors alternating between inner and outer radii, where arrays 22 and 24 share the same radii and the light detectors thereof are staggered and interleaved along the two radii. Such a configuration can reduce or eliminate the effects of reflected light beams or rays 25 falling non-uniformly on light detector arrays placed at different radii. In addition, more than two arrays of light detectors 22 and 24 may also be employed.

Although a single light emitter 28 is shown in the embodiment of FIGS. 1(a) through 1(c), other numbers of emitters, or arrays of emitters, may also be employed. Note further that light emitter 28 is preferably mounted in alignment with the central rotational axis of gear 40.

First and second output signals are generated by first and second arrays of light detectors 22 and 24 and the sensing and processing circuitry associated therewith. As gear 40 and optically reflective first area 35 rotate, the number of light detectors disposed along tracks 17 and 19 which receive light increase on one of tracks 17 and 19, and decrease on the other track. After gear 40 and optically reflective first area 35 have completed a single revolution, one cycle of a first output signal and second output signal have been generated (see FIGS. 16(a) and 16(b), discussed in further detail below).

In one embodiment, individual light detectors disposed along track 17 are connected electrically in parallel and produce a single first output signal, while individual light detectors disposed along track 19 are also connected electrically in parallel and produce a single second output signal. These first and second output signals are out of phase with respect to one another by a predetermined phase difference which is determined by the relative overlap and positioning of the individual light detectors disposed along tracks 17 and 19 in arrays 22 and 24. In a preferred embodiment the resulting phase shift is 90 degrees such that first sine and second cosine output signals are provided. (Note, however, that sinusoidal output signals are not required; other types of output signals may also be employed successfully so long as gear position can be derived from them.) Alternatively, selected ones of the signals provided by the individual light detectors disposed along tracks 17 and 19 are multiplexed and sorted by a processor to provide the desired output signals and phase difference therebetween. In still another embodiment, the individual light detectors disposed along tracks 17 and 19 in arrays 22 and 24 may be configured to have different weights or sensitivities, which may be hardwired using circuitry or assigned using a processor.

FIGS. 1(a) through 1(c) show that gear 40 has no holes or apertures disposed therethrough, which maximizes the amount of area of upper surface 31 that may be dedicated to reflective first area 35 and non-reflective second area 33. Note that so long as an insufficient amount of light is reflected therefrom for detection by light detector arrays 22 and 24, non-reflective area 33 may be partially reflective. The lack of holes or apertures disposed through gear 40 results in the ability to make gear 40 smaller than it could otherwise be without substantially sacrificing optical performance or efficiency. The lack of holes or apertures disposed through gear 40 also results in the ability to manufacture gear 40 to very close and accurate tolerances—even though gear 40 may be of very small size—since no holes or apertures are present in gear 40 that might otherwise cause warping or introduce distortions in gear 40 as it is being formed by, for example, injection molding, as in some prior art reflective optical encoder gears, or that might otherwise complicate the manufacturing process. According to one embodiment, gear 40 is formed of plastic, a polymer or polymers, metal, or any other suitable material, and may be formed by any one of a number of suitable manufacturing processes such as injection molding, machining, thermoforming, and so on. Shaft 67 may be configured for insertion in underside 37 of gear 40 according to any of a number of different methods, such as pressure fitting, gluing, epoxying, molding, mechanical attachment means such as screws or pins, and the like.

Figure 2A:
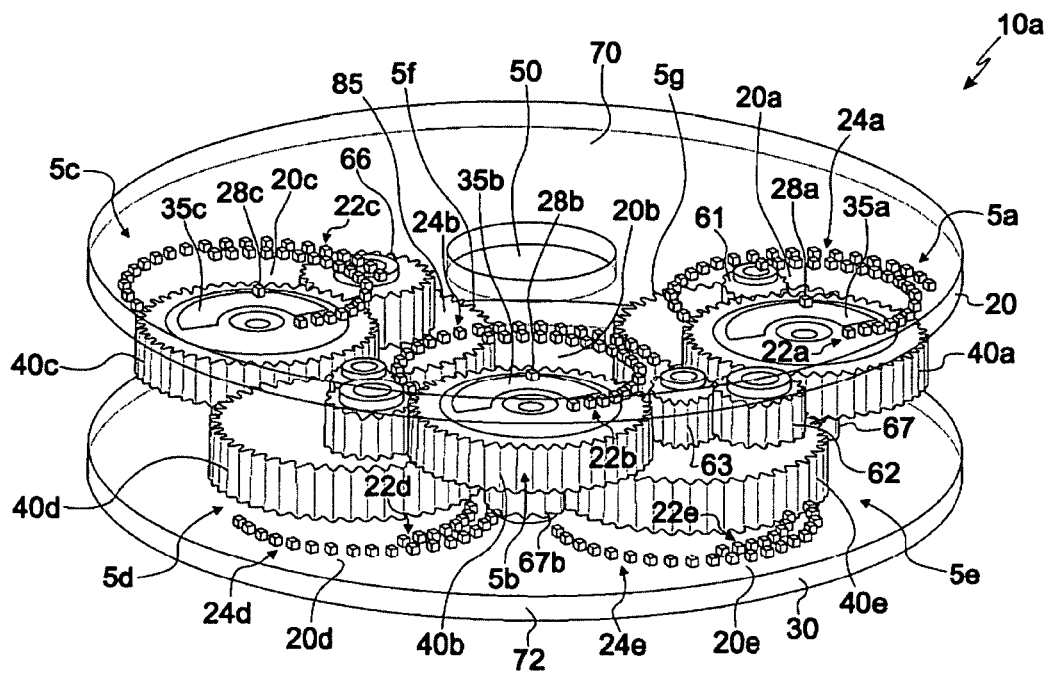
Figure 2B:
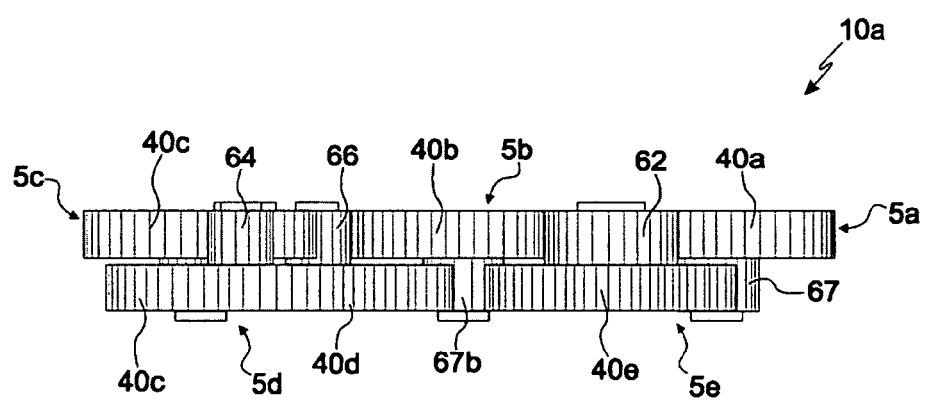

FIGS. 2(a) and 2(b) show top perspective and side views of one embodiment of reflective multi-turn optical encoder 10a, which comprises a plurality of reflective multi-turn optical encoder sub-modules 5a through 5g, which comprise, respectively, gears 40a through 40g and corresponding substrates 20a through 20g. As shown in FIGS. 2(a) and 2(b), reflective multi-turn optical encoder 10a houses sub-modules 5a through 5g between top substrate 70 and bottom substrate 72. Top substrate 70 has central aperture 50 disposed therethrough which is configured to accept a pinion (not shown in the Figures) operably therein and therethrough for rotatable engagement with gear 85. The number of turns or revolutions made by, or the absolute position of, such pinion may be measured by multi-turn optical encoder 10a.

In the embodiment of multi-turn optical encoder 10 illustrated in FIGS. 2(a) and 2(b), there are seven sub-modules 5a through 5g, each of which provides two bits of resolution respecting the number of turns or revolutions, or the absolute position of, the pinion or shaft which fits through central aperture 50 and engages the gear train disposed within module 10a. In a 14-bit reflective multi-turn optical encoder, the signals generated by each of sub-modules 5a through 5g comprising encoder module or system 10s may be processed to yield 2-bit positions for each of gears 40a through 40g in system 10a. Thus, seven sets of sub-modules 5a through 5g are provided to yield a 14-bit absolute position encoder module or system 10a. Other resolutions may of course be provided by various embodiments of system 10, such as 2-bit systems (one sub-module 5), 4-bit systems (two sub-modules 5), 6-bit systems (three sub-modules 5), 8-bit systems (four sub-modules 5), 10-bit systems (five sub-modules 5), 12-bit systems (six sub-modules 5), 16-bit systems (eight sub-modules 5), and so on. Additionally, the various sub-modules disclosed herein may be configured to provide 4 bits of resolution, thereby doubling the resolution that may be obtained respecting 2-bit systems.

Figures 3A, 3B:
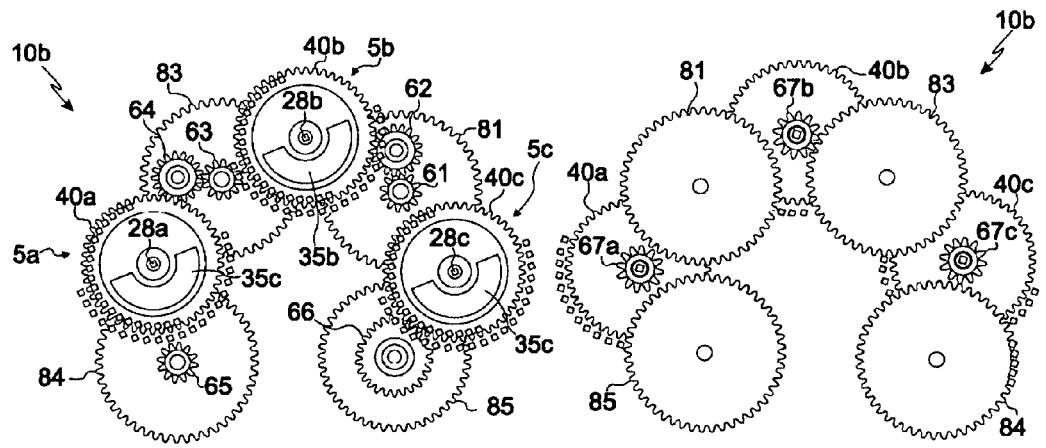
Figures 4A, 4B:
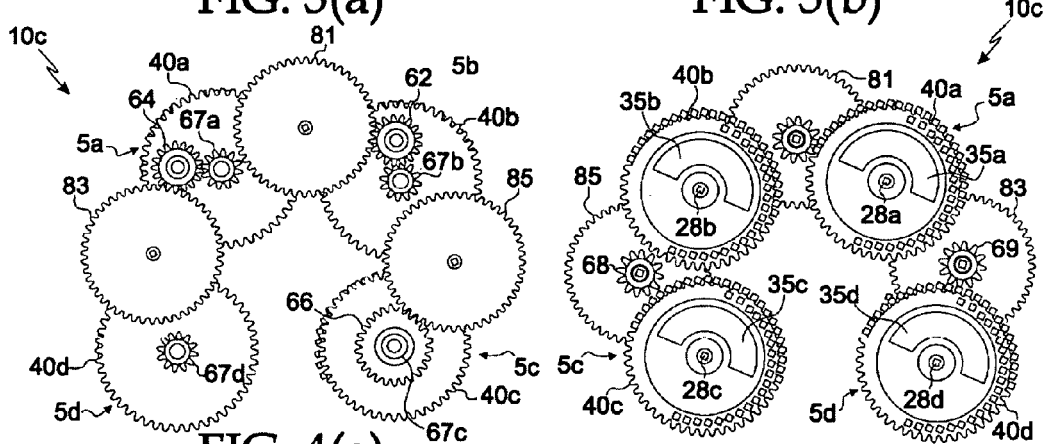
Figures 5A, 5B:
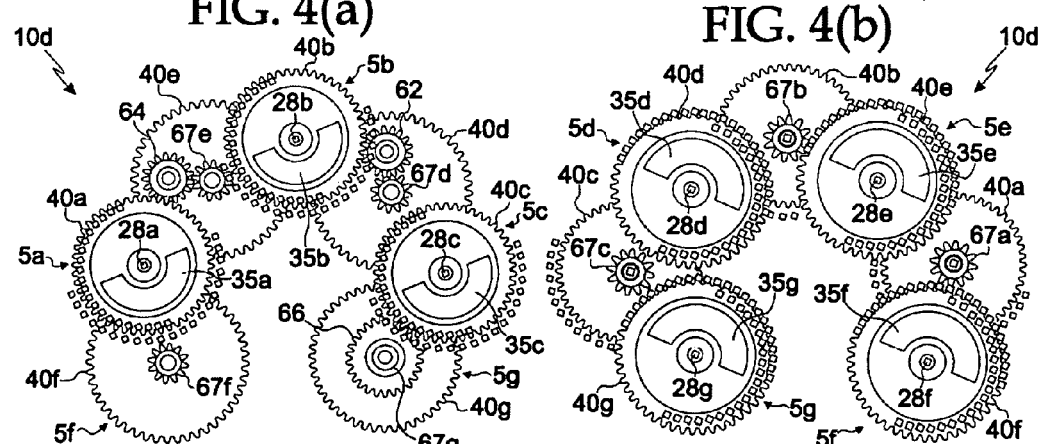

Referring now to FIGS. 3(a) through 5(b), there are shown three additional embodiments of reflective multi-turn optical encoder modules 10b through 10d which employ multiple light detectors in fashions similar to those of FIGS. 1(a) through 2(b). FIGS. 3(a) and 3(b) illustrate an embodiment of reflective multi-turn optical encoder module 10b having three sub-modules 5a through 5c disposed in a top layer thereof, and which are driven by gears 81, 83, 84 and 85 disposed in a lower layer thereof. The embodiment of reflective multi-turn optical encoder 10b shown in FIGS. 3(a) and 3(b) is capable of providing 12 bits of resolution seeing as module 10b contains three sub-modules 5a, 5b and 5c. When every other gear is skipped, then 4 bits are output from each of sub-modules 5a, 5b and 5c. Thus, the second gear yields 4 bits, the fourth gear yields 4 bits, and the sixth gear yields 4 bits for a total of 12 bits. FIGS. 4(a) and 4(b) illustrate an embodiment of reflective multi-turn optical encoder module 10c having four sub-modules 5a through 5d disposed in a bottom layer thereof, and which are driven by gears 81, 83 and 85 disposed in an upper layer thereof. The embodiment of reflective multi-turn optical encoder 10c shown in FIGS. 4(a) and 4(b) is capable of providing 14 bits of resolution seeing as module 10c contains four sub-modules 5a, 5b, 5c and 5d. The first gear yields 2 bits, and the third, fifth and seventh gears yield 4 bits each for a total of 14 bits. FIGS. 5(a) and 5(b) illustrate an embodiment of reflective multi-turn optical encoder module 10d having seven sub-modules 5a through 5g disposed in top and bottom layers thereof, and which are driven by the geared peripheries of gears 40a through 40g, gears 62 and 64, and geared shafts 67a through 67g disposed in upper and lower layers thereof. The embodiment of reflective multi-turn optical encoder 10d shown in FIGS. 5(a) and 5(b) is capable of providing 14 bits of resolution seeing as module 10d contains seven sub-modules 5a through 5g, each of which provides 2 bits of resolution.

Figure 6A:
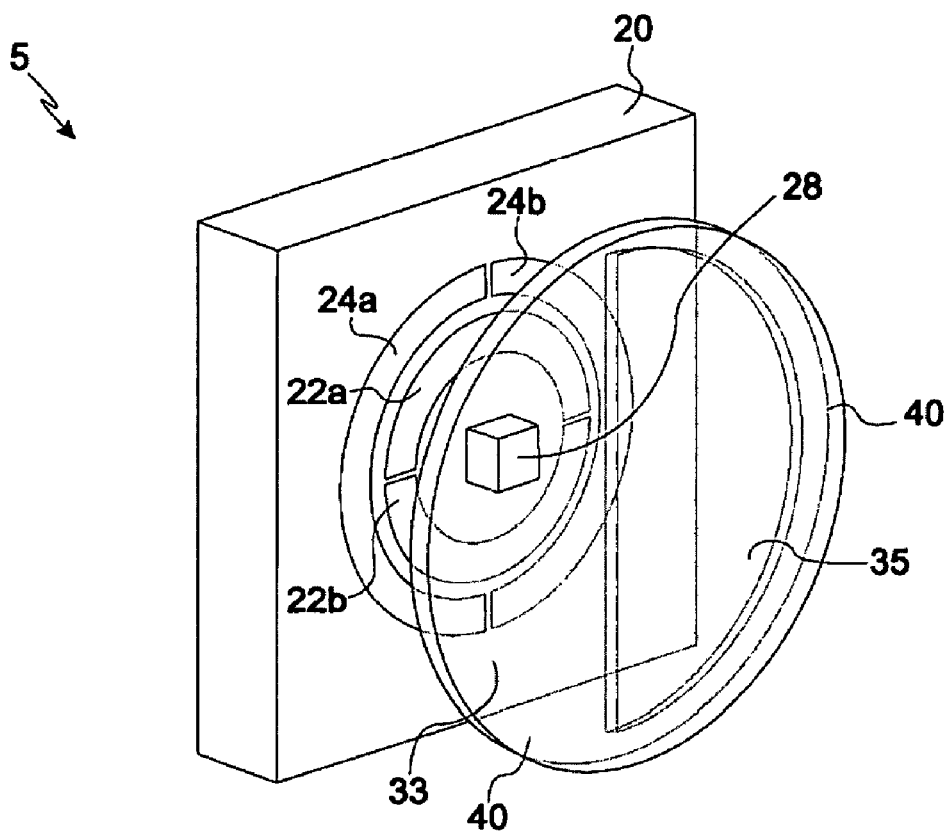
FIGS. 6(a) and 6(b) show perspective and side views, respectively, of one embodiment of sub-module 5 comprising stacked die sensing systems.
Figure 6B:
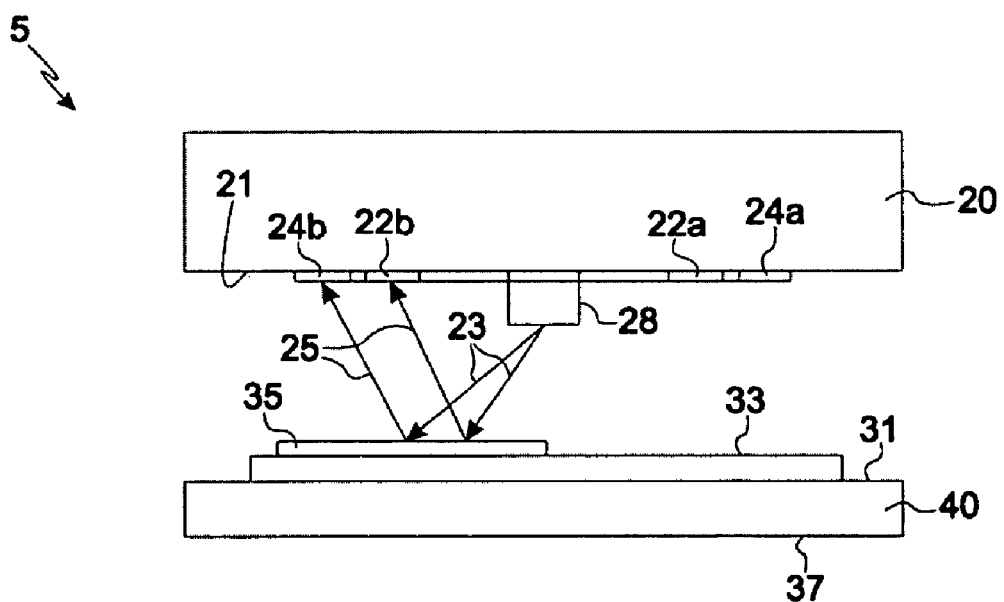

Referring now to FIGS. 6(a) and 6(b), there is shown an embodiment of a portion or sub-module 5 of a multiple light detector reflective multi-turn optical encoder module 10 (not shown in FIG. 6(a) or 6(b), but discussed in detail below in connection with FIGS. 7(a) through 10(b)), where optically reflected light rays or beams are sensed using a stacked die sensing system that, in the embodiments illustrated in FIGS. 6(a) and 6(b), employs pairs of concentrically-arranged, half-ring-shaped light detectors 24a and 24b, and 22a and 22b, to sense movement of gear 40, and thereby sense and record the rotation of an associated pinion (not shown in FIGS. 6(a) and 6(b)). To sense and record the rotation of gear 40, optically reflective first area 35 is formed or attached onto upper surface 31 of gear 40, and emitter 28 and pairs of half-ring-shaped detectors 22a and 22b, and 24a and 24b, are placed facing optically reflective first area 35. FIGS. 6(a) and 6(b) show the optical configuration and coupling of sub-module 5 between gear 40, emitter 28, pairs or arrays of light detectors 22a and 22b, and 24a and 24b, and optically reflective first area or reflective code disk 35 and gear, where the plane defined by upper surface 31 is substantially parallel to the plane defined by lower surface 21 of substrate 20.

Note that the shape and number of light detectors 24a and 24b, and 22a and 22b may be modified with respect to the configurations shown in the Figures without departing from the scope or spirit of some embodiments of the invention. For example, light detectors 24a and 24b, and 22a and 22b, need not be half-ring-shaped, and may assume any other suitable geometry or shape capable of providing sufficient optical coupling with reflected light 25. More than two light detectors may be provided for each of array of light detectors 22 and 24, and more than two arrays of light detectors 22 and 24 may be provided.

In some embodiments of the stacked die sensing systems disclosed herein, the arrays of light detectors may be interleaved, staggered or overlap with one another, arranged in non-circular geometries, be arranged at varying or overlapping radii, and/or may be configured in areal arrays comprising multiple discrete light detectors that may or may not be interspersed, overlapped, staggered or interleaved respecting one another. Such array patterns or areal arrays are preferably configured to yield output signals therefrom that assume desired morphologies or waveforms, such as smoothly-varying sinusoidal curves, triangular curves, squared or blunted curves, customized output signals, or any other desired output signal shape determined by the areal pattern or array geometries. In other embodiments, the light detectors in arrays 22 and 24 are arranged along circular paths that are defined by staggered and interleaved arrays 22 and 24 having light detectors alternating between inner and outer radii, where arrays 22 and 24 share the same radii and the light detectors thereof are staggered and interleaved along the two radii. Such a configuration can reduce or eliminate the effects of reflected light beams or rays 25 falling non-uniformly on light detector arrays placed at different radii.

Continuing to refer to FIGS. 6(a) and 6(b), gear 40 has an outer geared periphery (not shown in FIGS. 6(a) and 6(b)), and upper surface 31 of gear 40 has no apertures or holes disposed therethrough. A geared rotatable shaft (also not shown in FIG. 6(a) or 6(b)) is attached to or disposed on or in underside 37 of gear 40. Shaft 67 is caused to turn through the action of a matingly engaging a different shaft (not shown in FIGS. 6(a) and 6(b)), the number of revolutions turned of which, or the absolute position of which, are to be determined.

Optically reflective first area 35 is disposed on or in, or formed into or on, a first portion of upper surface 31, while an optically substantially non-reflective second area 33 is disposed on or in, or formed in or on, a second portion of upper surface 31. Substrate 20, which in the embodiment illustrated in FIGS. 6(a) and 6(b) is an integrated circuit, is operably disposed above and opposes upper surface 31. As shown in FIGS. 6(a) and 6(b), substrate 20 comprises light emitter 28 attached thereto, first pair of inner half-ring-shaped light detectors 22a and 22b, and second pair of outer half-ring-shaped light detectors 24a and 24b arranged concentrically in respect of one another.

As shown in FIGS. 6(a) and 6(b), gear 40 and substrate 20 are configured and arranged respecting one another such that at least portions of light 23 emitted by light emitter 28 and incident on first area 35 form reflected light beams 25 which are directed towards at least portions of first and second pairs of ring-shaped light detectors 22a and 22b, and 24a and 24b, for detection thereby as gear 40 and substrate 20 rotate in respect of one another. In addition, at least portions of light 23 emitted by light emitter 28 and incident on second area 33 are substantially not reflected from second area 33 and are consequently not detected by first or second pairs of ring-shaped light detectors 22a and 22b, and 24a and 24b, as gear 40 and substrate 20 rotate in respect of one another.

As further shown in FIGS. 6(a) and 6(b), substrate 20 comprises four separate ring-shaped, half-circle photodetectors 22a, 22b, 24a and 24b. Each such photodetector generates either a positive signal (i.e., photodetectors 22a and 24a), or a negative signal (photodetectors 22b and 24b. Thus, positive and negative polarity signals are generated by photodetectors 22a and 22b, respectively, which form an inner pair of ring-shaped detectors disposed along the same inner radius, and positive and negative polarity signals are generated by photodetectors 24a and 24b, respectively, which form an outer pair of ring-shaped detectors disposed along the same outer radius. As can be seen by referring to FIGS. 6(a) and 6(b), the inner and outer rings defined by photodetectors 22a/22b and 24a/24b are shifted ninety degrees in respect of one another. Emitter 28 is located at the center of the two pairs of ring-shaped detectors. In the embodiment shown in FIGS. 6(a) and 6(b), a half-section reflective code wheel or optically reflective first area 35 is located opposite from and centered in respect of light emitter 28.

FIG. 6(b) shows that light emitted by light emitter 28 is reflected from reflective code wheel or optically reflective first area 35 in the direction of the two pairs of ring-shaped photodetectors 22a/22b and 24a/24b, where electrical output signals are generated in accordance with their respective polarities and positions. Such output signals may be processed by a position logic device to yield, for example, the absolute position of the pinion connected to the module within which sub-module 5 is mounted or attached.

Other numbers, spacings and geometries of the individual light detectors 22a, 22b, 24a and 24b are also contemplated. Although a single light emitter 28 is shown in the embodiment of FIGS. 6(a) and 6(b), other numbers of emitters, or arrays of emitters, may also be employed. Note further that light emitter 28 is preferably mounted in alignment with the central rotational axis of gear 40.

First and second output signals are generated by pairs of ring-shaped light detectors 22a/22b and 24a/24b and the sensing and processing circuitry associated therewith. As gear 40 and optically reflective first area 35 rotate, pairs of ring-shaped light detectors 22a/22b and 24a/24b are illuminated such that while the light incident on one pair increases, the incident on the other pair decreases. After gear 40 and optically reflective first area 35 have completed a single revolution, one cycle of a first output signal and second output signal are generated (see FIGS. 16(a) and 16(b), discussed in further detail below).

In one embodiment, the pair of ring-shaped light detectors 22a and 22b are each connected electrically in a differential manner and produce a single first output signal, while pair of ring-shaped light detectors 24a and 24b are also connected electrically in a differential manner and produce a single second output signal. These first and second output signals are out of phase with respect to one another by a predetermined phase difference, which is determined by the relative overlap and positioning of pairs of ring-shaped light detectors 22a/22b and 24a/24b. The preferred embodiment illustrated in FIGS. 6(a) and 6(b) results in a phase shift of 90 degrees such that first sine and second cosine output signals are provided. Alternatively, selected ones of the signals provided by the light detectors 22a, 22b, 24a and 24b may be multiplexed and sorted by a processor to provide the desired output signals and phase differences therebetween. In still another embodiment, individual light detectors 22a, 22b, 24a and 24b may be configured to have different weights or sensitivities, which may be hardwired using circuitry or assigned using a processor.

FIGS. 6(a) and 6(b) show that gear 40 has no holes or apertures disposed therethrough, however, which maximizes the amount of area of upper surface 31 that may be dedicated to reflective first area 35 and non-reflective second area 33. The lack of holes or apertures disposed through gear 40 results in the ability to make gear 40 smaller than it could otherwise be without substantially sacrificing optical performance or efficiency. The lack of holes or apertures disposed through gear 40 also results in the ability to manufacture gear 40 to very close and accurate tolerances—even though gear 40 may be of very small size—since no holes or apertures are present in gear 40 that might otherwise cause warping or introduce distortions in gear 40 as it is being formed by, for example, injection molding, as in some prior art reflective optical encoder gears, or that might otherwise complicate the manufacturing. According to one embodiment, gear 40 is formed of plastic, a polymer or polymers, metal, or any other suitable material, and may be formed by any one of a number of suitable manufacturing processes such as injection molding, machining, thermoforming, and so on. Shaft 67 may be configured for insertion in underside 37 of gear 40 according to any of a number of different methods, such as pressure fitting, gluing, epoxying, molding, mechanical attachment means such as screws or pins, and the like.

Figure 7A:
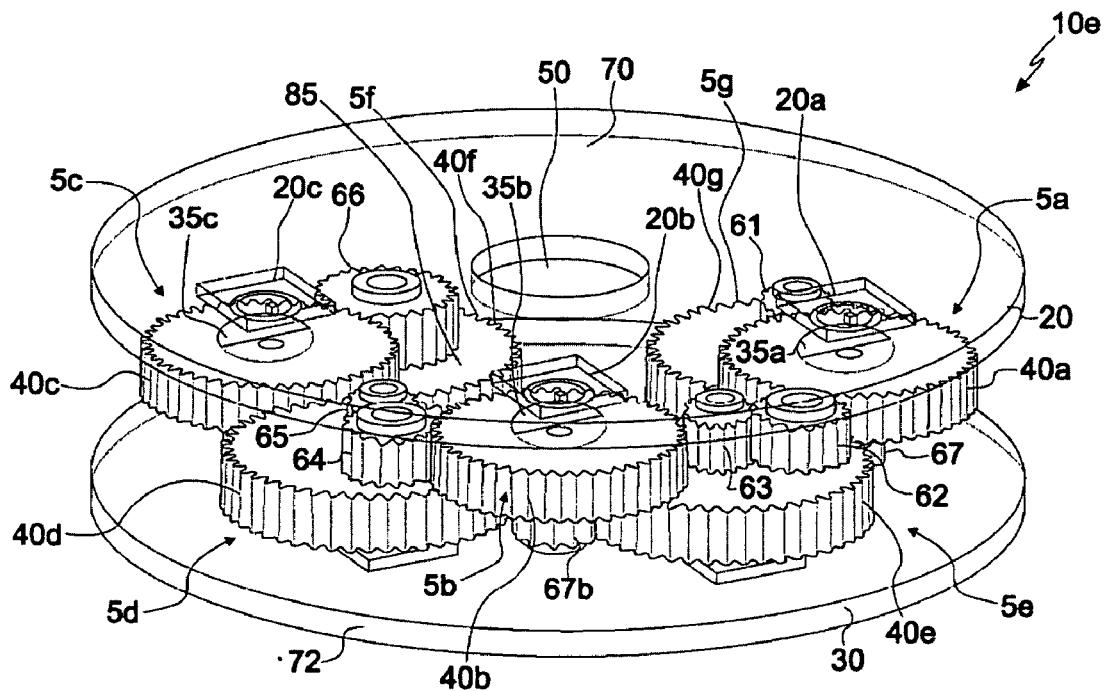
Figure 7B:
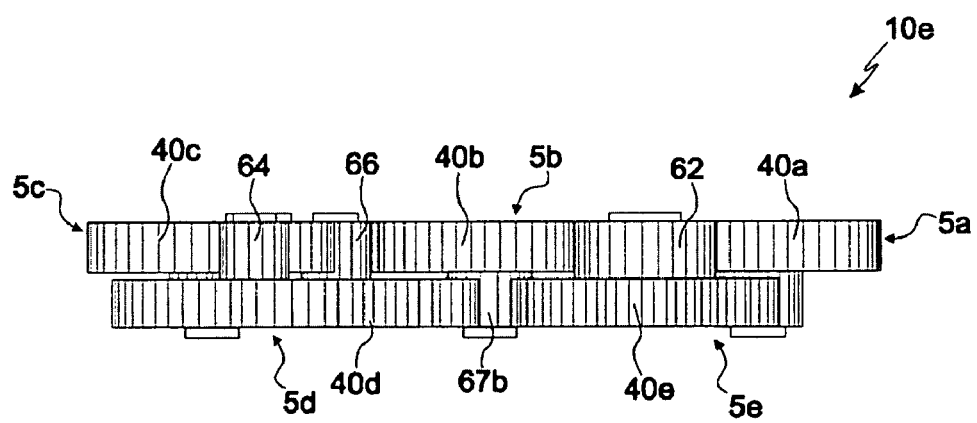

FIGS. 7(a) and 7(b) show top perspective and side views of one embodiment of reflective multi-turn optical encoder 10e, which comprises a plurality of reflective multi-turn optical encoder sub-modules 5a through 5g, which comprise, respectively, gears 40a through 40g and corresponding substrates 20a through 20g. For the sake of simplicity and to avoid obscuring the invention, not all constituent components of each of sub-modules 5a through 5g are shown in FIGS. 7(a) and 7(b). For example, light detectors 22a, 22b, 24a and 24b and light emitters 28 are not shown in FIGS. 7(a) and 7(b). As shown in FIGS. 7(a) and 7(b), reflective multi-turn optical encoder 10e houses sub-modules 5a through 5g between top substrate 70 and bottom substrate 72. Top substrate 70 has central aperture 50 disposed therethrough, which is configured to accept a pinion (not shown in the Figures) operably therein and therethrough for rotatable engagement with gear 85. The number of turns or revolutions made by, or the absolute position of, such pinion may be measured by multi-turn optical encoder 10e.

In the embodiment of multi-turn optical encoder 10e illustrated in FIGS. 7(a) and 7(b), there are seven sub-modules 5a through 5g, each of which provides two bits of resolution respecting the number of turns or revolutions, or the absolute position of, the pinion or shaft configured to fit through central aperture 50 and engage the gear train disposed within module 10e. In a 14-bit reflective multi-turn optical encoder, the signals generated by each of sub-modules 5a through 5g comprising encoder module or system 10e may be processed to yield 2-bit positions for each of gears 40a through 40g in system 10e. Thus, seven sets of sub-modules 5a through 5g are provided to yield a 14-bit absolute position encoder module or system 10e. Other resolutions may of course be provided by various embodiments of system 10e, such as 2-bit systems (one sub-module 5), 4-bit systems (two sub-modules 5), 6-bit systems (three sub-modules 5), 8-bit systems (four sub-modules 5), 10-bit systems (five sub-modules 5), 12-bit systems (six sub-modules 5), 16-bit systems (eight sub-modules 5), and so on. Additionally, some of the various sub-modules disclosed herein may be configured to provide 4 bits of resolution, thereby doubling the resolution that may be obtained respecting 2-bit systems.

Figures 8A, 8B, 9A, 9B, 10A, 10B:
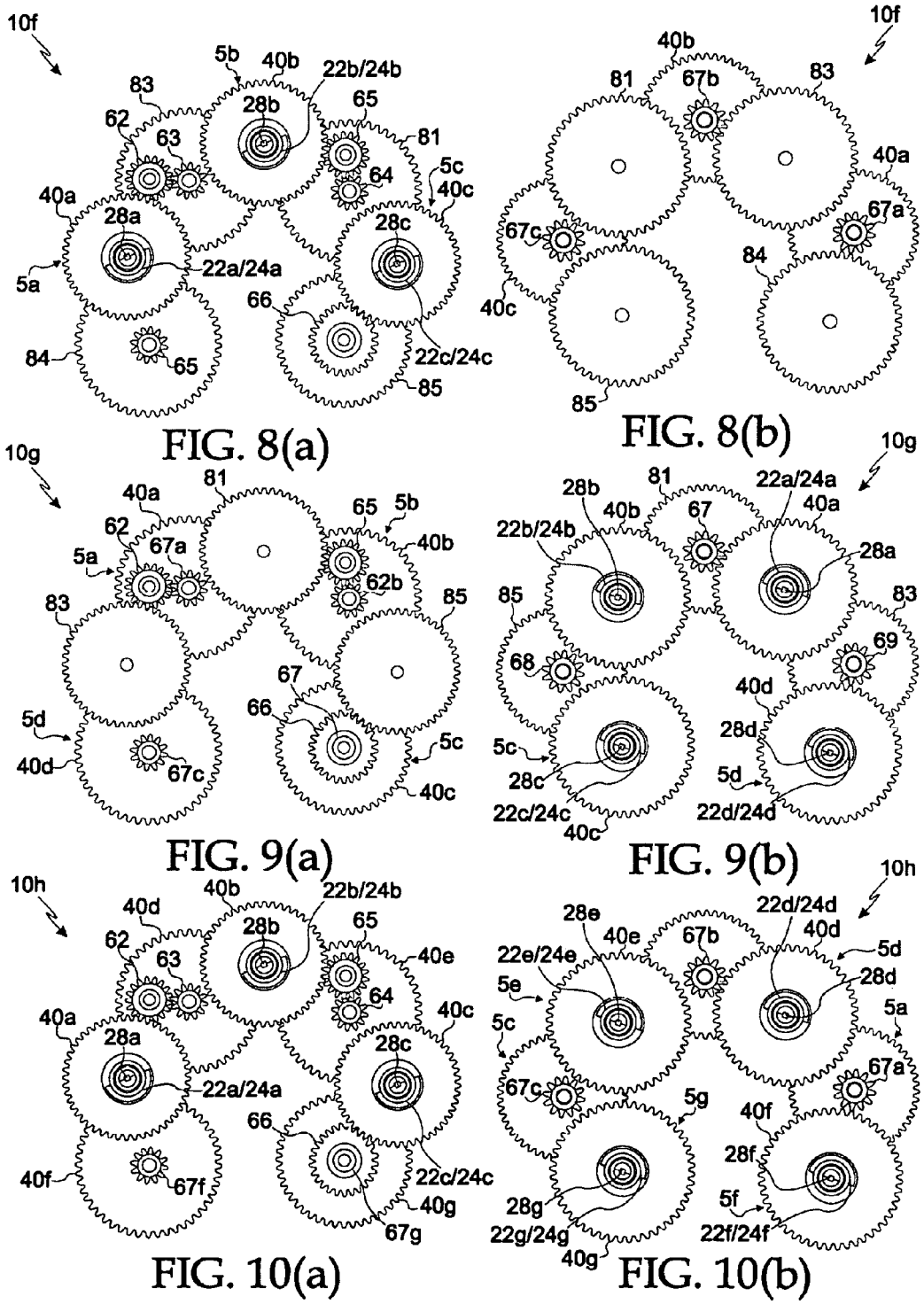

Referring now to FIGS. 8(a) through 10(b), there are shown three additional embodiments of reflective multi-turn optical encoder modules 10f through 10h which employ multiple light detectors in fashions similar to those illustrated in FIGS. 6(a) and 6(b). FIGS. 8(a) and 8(b) illustrate an embodiment of reflective multi-turn optical encoder module 10f having three sub-modules 5a through 5c disposed in a top layer thereof, and which are driven by gears 81, 83, 84 and 85 disposed in a lower layer thereof. The embodiment of reflective multi-turn optical encoder 10f shown in FIGS. 8(a) and 8(b) is capable of providing 6 bits of resolution seeing as module 10f contains three sub-modules 5a, 5b and 5c, each of which provides 2 bits of resolution. FIGS. 9(a) and 9(b) illustrate an embodiment of reflective multi-turn optical encoder module 10g having four sub-modules 5a through 5d disposed in a bottom layer thereof, and which are driven by gears 81, 83 and 85 disposed in an upper layer thereof. The embodiment of reflective multi-turn optical encoder 10g shown in FIGS. 9(a) and 9(b) is capable of providing 14 bits of resolution seeing as module 10g contains four sub-modules 5a (2 bits), 5b 4 bits), 5c (4 bits), and 5d (bits). FIGS. 10(a) and 10(b) illustrate an embodiment of reflective multi-turn optical encoder module 10h having seven sub-modules 5a through 5g disposed in top and bottom layers thereof, and which are driven by the geared peripheries of gears 40a through 40g, gears 62 and 64, and geared shafts 67a through 67g disposed in upper and lower layers thereof. The embodiment of reflective multi-turn optical encoder 10h shown in FIGS. 10(a) and 10(b) is capable of providing 14 bits of resolution seeing as module 10d contains seven sub-modules 5a through 5g, each of which provides 2 bits of resolution.

Figure 11A:
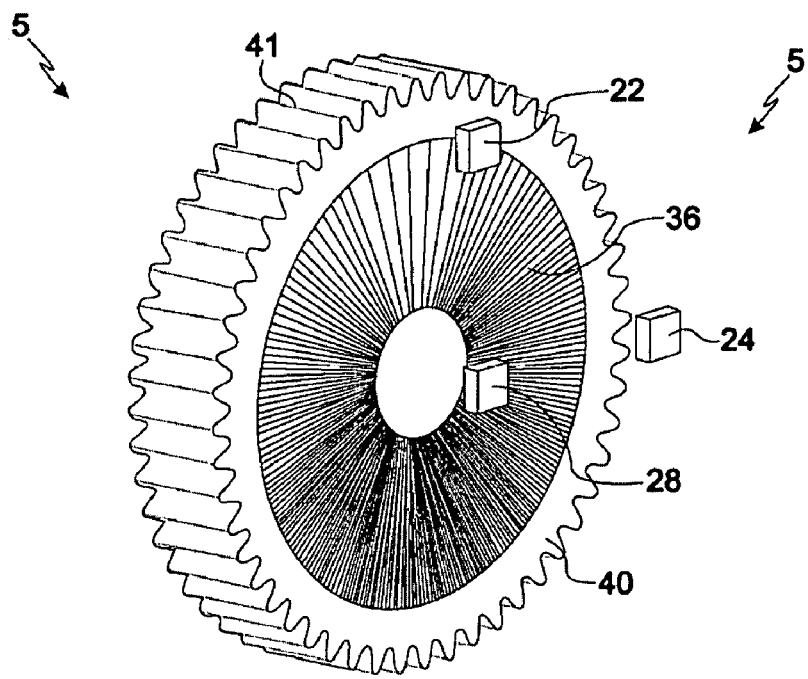
FIGS. 11(a) and 11(b) show perspective and side views, respectively, of one embodiment of sub-module 5 comprising a variable tone density sensing system.
Figure 11B:
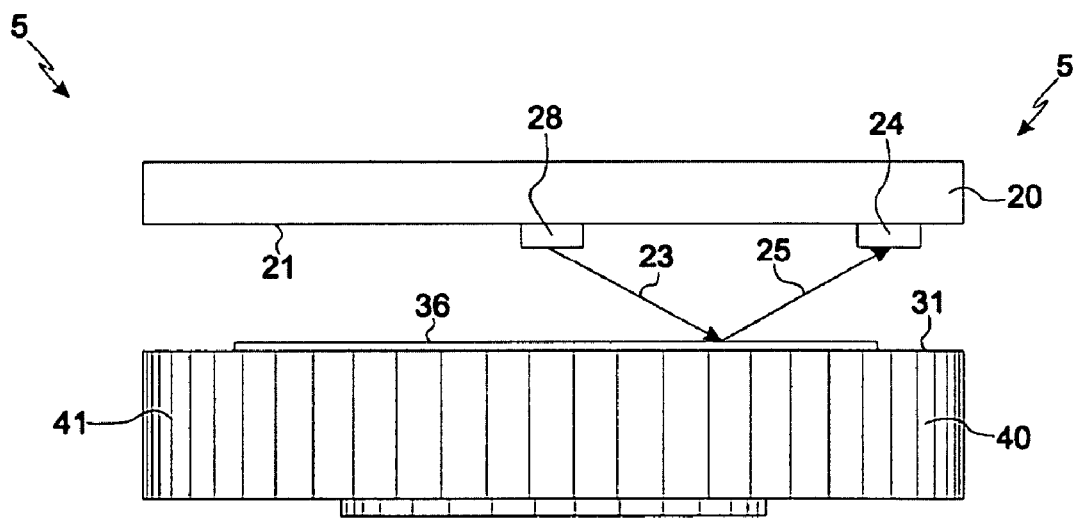

Referring now to FIGS. 11(a) and 11(b), there is shown an embodiment of a portion or sub-module 5 of a multiple detector reflective multi-turn optical encoder module 10 (not shown in FIG. 11(a) or 11(b), but discussed in detail below in connection with FIGS. 12(a) through 15(b)), where optically reflected light rays or beams are sensed using a variable tone density sensing system that employs variable tone density code wheel 36 to sense movement of gear 40, and thereby sense and record the rotation of an associated pinion (not shown in FIGS. 11(a) and 11(b)). To sense and record the rotation of gear 40, optically reflective variable tone density code wheel 36 is formed or attached onto upper surface 31 of gear 40, and emitter 28 is placed facing optically reflective variable tone density code wheel 36 such that light emitted by light emitter 28 is reflected from code wheel 36 back to light detectors 22 and 24. FIGS. 11(a) and 11(b) show the optical configuration and coupling of sub-module 5 between gear 40, emitter 28, light detectors 22 and 24, and optically reflective variable tone density code wheel 36, where the plane defined by upper surface 31 is substantially parallel to the plane defined by lower surface 21 of substrate 20.

Continuing to refer to FIGS. 11(a) and 11(b), gear 40 has an outer geared periphery (not shown in FIGS. 11(a) and 11(b)), and upper surface 31 of gear 40 has no apertures or holes disposed therethrough. A geared rotatable shaft (also not shown in FIG. 11(a) or 11(b)) is attached to or disposed on or in underside 37 of gear 40. Shaft 67 is caused to turn through the action of a matingly engaging another shaft (not shown in FIGS. 11(a) and 11(b)), the number of revolutions turned of which, or the absolute position of which, are to be determined.

Optically reflective variable tone density code wheel 36 is disposed on or in, or formed in or on, a first portion of upper surface 31, and features areas of variable reflectivity according to radial position. Substrate 20 is operably disposed above and opposes upper surface 31. As shown in FIGS. 11(a) and 11(b), substrate 20 comprises light emitter 28 and a pair of light detectors 22 and 24.

As shown in FIGS. 11(a) and 11(b), gear 40 and substrate 20 are configured and arranged respecting one another such that at least portions of light 23 emitted by light emitter 28 and incident on Optically reflective variable tone density code wheel 36 form reflected light beams 25 which are directed towards first and second light detectors 22 and 24 for detection thereby as gear 40 and substrate 20 rotate in respect of one another.

The density pattern formed on or presented by optically reflective variable tone density code wheel 36 may be varied according to any suitable desired density profile. The density profile or pattern of code wheel 36 may be varied between 0° and 360° so as to provide a varying reflectance profile as a function of rotation angle. Such a profile or pattern may be generated using any suitable method, such as, by way of example, metal vapor deposition techniques, metal sputtering techniques, optical coating techniques, photo imaging techniques, half-tone printing with lines or dots, reflective plastic film, a metal code wheel, one or more optically reflective coatings disposed on plastic or glass, and the like. In one embodiment, the variable density pattern of codewheel 36 shown in FIGS. 11(a) and 11(b) creates a relatively smooth sinusoidal reflectance profile as a function of angle of rotation. The variable density pattern imprinted, formed on or presented by code wheel 36 can be for a single track or multiple tracks.

Continuing to refer to FIGS. 11(a) and 11(b), the embodiment of variable tone density sensing system or sub-module 5 comprises light detectors 22 and 24 arranged along a common radius or diameter but shifted 90 degrees in respect of one another and disposed opposite variable density reflective code wheel 36. Light emitter 28 is preferably located along the rotational axis of gear 40.

As further shown in the embodiment of FIGS. 6(a) and 6(b), substrate 20, which in the embodiment illustrated in FIGS. 6(a) and 6(b) is an integrated circuit, comprises two photodetectors 22 and 24 disposed 90 degrees apart from one another. Each photodetector generates an output signal which is proportional to the amount of light incident thereon, which varies as code wheel 36 rotates therebeneath and the reflectivity thereof varies with rotational angle such that, for example, the amount of reflectance of code wheel 36 increases between a minimum reflectance at 0 degrees and a maximum reflectance at 180 degree, returning to a minimum at 360 (or 0) degrees. Thus, each of light detectors 22 and 24 produces a relatively smoothly varying output signal that varies between a minimum level and a maximum level, but the two output signals are separated by 90 degrees. The electrical output signals generated by light detectors 22 and 24 may be processed by a position logic device to yield, for example, the absolute position of the pinion connected to the module within which sub-module 5 is mounted or attached.

Other numbers, spacings, phase shifts and geometries of light detectors 22 and 24 are also contemplated, such three light detectors or four light detectors, as are other variable density patterns of code wheel 36. Although a single light emitter 28 is shown in the embodiment of FIGS. 11(a) and 11(b), other numbers of emitters, or arrays of emitters, may also be employed. Note further that light emitter 28 is preferably mounted in alignment with the central rotational axis of gear 40.

First and second output signals are generated by light detectors 22 and 24, and the sensing and processing circuitry associated therewith. As gear 40 and optically reflective variable tone density code wheel 36 rotate, light detectors 22 and 24 are illuminated such that while the amount of light incident on one detector increases, the amount of light incident on the other detector decreases. After gear 40 and optically reflective variable tone density code wheel 36 have completed a single revolution, one cycle of a first output signal and a second output signal are generated. See, for example, FIGS. 16(a) and 16(b), discussed in further detail below.

FIGS. 11(a) and 11(b) show that gear 40 has no holes or apertures disposed therethrough, however, which maximizes the amount of area of upper surface 31 that may be dedicated to optically reflective variable tone density code wheel 36. The lack of holes or apertures disposed through gear 40 results in the ability to make gear 40 smaller than it could otherwise be without substantially sacrificing optical performance or efficiency. The lack of holes or apertures disposed through gear 40 also results in the ability to manufacture gear 40 to very close and accurate tolerances—even though gear 40 may be of very small size—since no holes or apertures are present in gear 40 that might otherwise cause warping or introduce distortions in gear 40 as it is being formed by, for example, injection molding, as in some prior art reflective optical encoder gears, or that might otherwise complicate the manufacturing process. According to one embodiment, gear 40 is formed of plastic, a polymer or polymers, metal, or any other suitable material, and may be formed by any one of a number of suitable manufacturing processes such as injection molding, machining, thermoforming, and so on. Shaft 67 may be configured for insertion in underside 37 of gear 40 according to any of a number of different methods, such as pressure fitting, gluing, epoxying, molding, mechanical attachment means such as screws or pins, and the like.

Figure 12A:
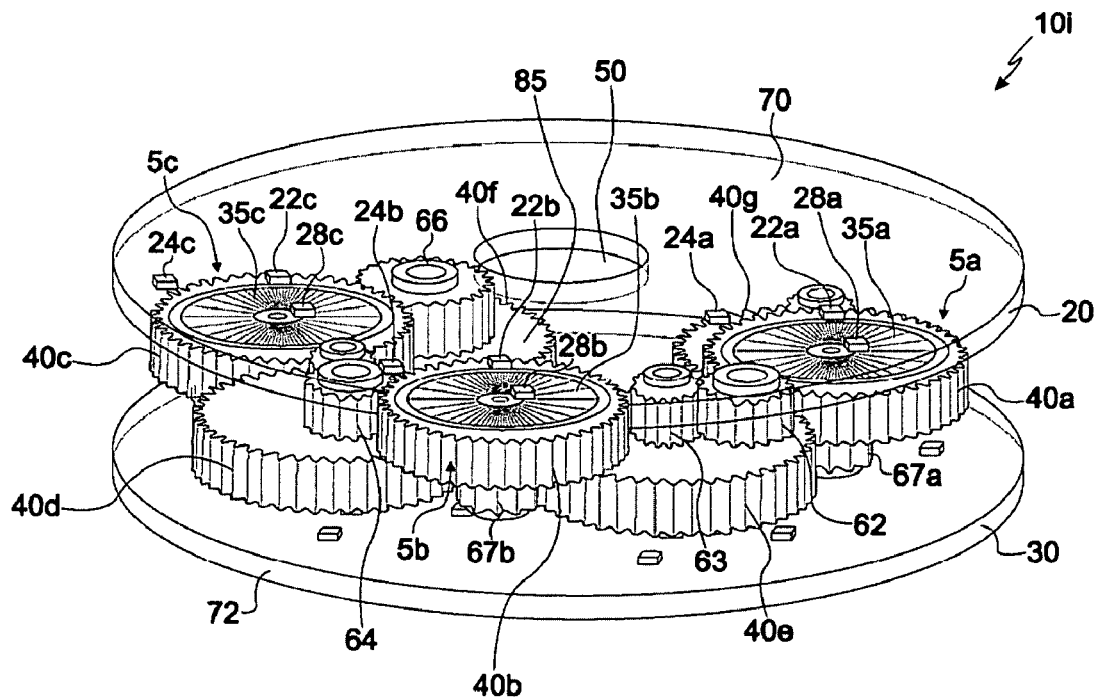
Figure 12B:
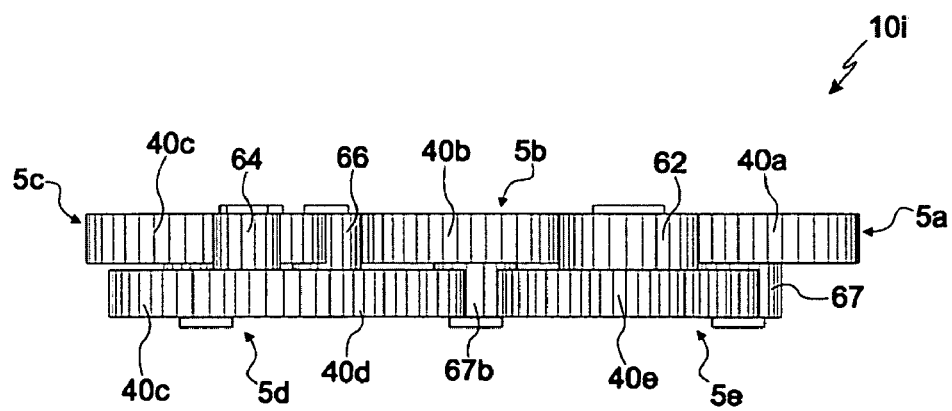

FIGS. 12(a) and 12(b) show top perspective and side views of one embodiment of reflective multi-turn optical encoder 10i, which comprises a plurality of reflective multi-turn optical encoder sub-modules 5a through 5g, which comprise, respectively, gears 40a through 40g and light emitters 28a through 28g. For the sake of simplicity and to avoid obscuring the invention, not all constituent components of each of sub-modules 5a through 5g are shown in FIGS. 12(a) and 12(b). As shown in FIGS. 12(a) and 12(b), reflective multi-turn optical encoder 10i houses sub-modules 5a through 5g between top substrate 70 and bottom substrate 72. Top substrate 70 has central aperture 50 disposed therethrough, which is configured to accept a pinion (not shown in the Figures) operably therein and therethrough for rotatable engagement with gear 85. The number of turns or revolutions made by, or the absolute position of, such pinion may be measured by multi-turn optical encoder 10i.

In the embodiment of multi-turn optical encoder 10i illustrated in FIGS. 11(a) and 11(b), there are seven sub-modules 5a through 5g, each of which provides two bits of resolution respecting the number of turns or revolutions, or the absolute position of, the pinion or shaft configured to fit through central aperture 50 and engage the gear train disposed within module 10i. In a 14-bit reflective multi-turn optical encoder, the signals generated by each of sub-modules 5a through 5g comprising encoder module or system 10i may be processed to yield 2-bit positions for each of gears 40a through 40g in system 10i. Thus, seven sets of sub-modules 5a through 5g are provided to yield a 14-bit absolute position encoder module or system 10i. Other resolutions may of course be provided by various embodiments of system 10i, such as 2-bit systems (one sub-module 5), 4-bit systems (two sub-modules 5), 6-bit systems (three sub-modules 5), 8-bit systems (four sub-modules 5), 10-bit systems (five sub-modules 5), 12-bit systems (six sub-modules 5), 16-bit systems (eight sub-modules 5), and so on. Additionally, some of the various sub-modules disclosed herein may be configured to provide 4 bits of resolution, thereby doubling the resolution that may be obtained respecting 2-bit systems.

Referring now to FIGS. 13(a) through 15(b), there are shown three additional embodiments of reflective multi-turn optical encoder modules 10j through 10l which employ variable density code wheels 36 and light detectors 22 and 24 in fashions similar to those illustrated in FIGS. 12(a) and 12(b). FIGS. 13(a) and 13(b) illustrate an embodiment of reflective multi-turn optical encoder module 10j having three sub-modules 5a through 5c disposed in a top layer thereof, and which are driven by gears 81, 83, 84 and 85 disposed in a lower layer thereof. The embodiment of reflective multi-turn optical encoder 10j shown in FIGS. 13(a) and 13(b) is capable of providing 12 bits of resolution seeing as module 10j contains three sub-modules 5a, 5b and 5c, each of which provides 4 bits of resolution. FIGS. 14(a) and 14(b) illustrate an embodiment of reflective multi-turn optical encoder module 10k having four sub-modules 5a through 5d disposed in a bottom layer thereof, and which are driven by gears 81, 83 and 85 disposed in an upper layer thereof. The embodiment of reflective multi-turn optical encoder 10k shown in FIGS. 14(a) and 14(b) is capable of providing 14 bits of resolution seeing as module 10k contains four sub-modules 5a, 5b, 5c and 5d. The first gear provides 2 bits, and the third, fifth and seventh gears provide 4 bits each. FIGS. 15(a) and 15(b) illustrate an embodiment of reflective multi-turn optical encoder module 10l having seven sub-modules 5a through 5g disposed in top and bottom layers thereof, and which are driven by the geared peripheries of gears 40a through 40g, gears 62 and 64, and geared shafts 67a through 67g disposed in upper and lower layers thereof. The embodiment of reflective multi-turn optical encoder 10l shown in FIGS. 15(a) and 15(b) is capable of providing 14 bits of resolution seeing as module 10l contains seven sub-modules 5a through 5g, each of which provides 2 bits of resolution.

Note that a position logic device, which may be any suitable processing or logic device, such as a controller, ASIC, processor, micro-processor, micro-controller, CPU, or any combination of appropriate logic hardware and/or software, is preferably provided to process the output signals provided by the light detectors of the various embodiments of sub-module 5 and reflective multi-turn optical encoder 10 disclosed herein.

Depending on the particular application at hand, reflective multi-turn encoder module 10 may be configured to provide any of a number of different gear reduction ratios in respect of rotation of the pinion or shaft configured for insertion in central aperture 50 (the absolute position or number of revolutions turned thereby is to be measured or sensed by optical encoder 10) and the rotation of the last geared circular disk caused to be rotated by the action of such pinion or shaft rotating, including, but not limited to gear reduction ratios of 4,096, 2,048, 1,024, 512 and 256. Note that gear reduction ratios other than those explicitly disclosed herein are also contemplated in the present invention. Implementation of a selected gear reduction ratio requires selecting an appropriate number of geared circular disks to employ, selecting the relative diameters and numbers of geared teeth of such disks respecting one another, and other factors well known to those skilled in the art of gear reduction. For example, multi-turn encoder module 10 may comprise three geared circular disks, where each disk imparts 4 bits of resolution to encoder module 10. In other examples, reflective multi-turn encoder module 10 may comprise one geared disk, two geared disks, four geared disks, five geared disks, seven geared disks, or any other suitable number of geared disks, where the number of geared disks selected will depend on the particular application at hand, the gear reduction ratio that is desired, the number of bits of resolution that are to be provided, and other considerations and factors known to those skilled in the art.

As a further example of gear reduction, the central geared shaft configured for insertion on central aperture 50 of module 10 is a pinion which meshes with and is configured to cause rotation of a first gear when such shaft rotates. The gear ratio between the shaft and the first gear is 1:4. Thus, when the first gear completes one revolution, the shaft has rotated four revolutions ($2^2$, or 2 bits). The gear ratio between the first gear and an adjacent second gear may also be 1:4. Thus, when the second gear completes one revolution, the first gear has completed four revolutions (also $2^2$, or 2 bits), while at the same time the central shaft has rotated 16 revolutions ($2^4$, or 4 bits), and so on. Because multi-turn encoder modules 10 shown in FIGS. 1(a) through 15(b) comprise different numbers of geared disks or gears, the number of bits of resolution provided by such modules varies. (As discussed above, other gear ratios and numbers of gears or geared disks may also be employed and nevertheless fall within the scope of the present invention.)

Note that phase differences between light detectors other than 90 degrees (e.g., SIN and COS) are contemplated in the present invention, and that such phase differences can assume any suitable value. Note further that counts other than those represented by 2 or 4 bits are also contemplated in the present invention, and may be any suitable number of bits.

Figure 16A:
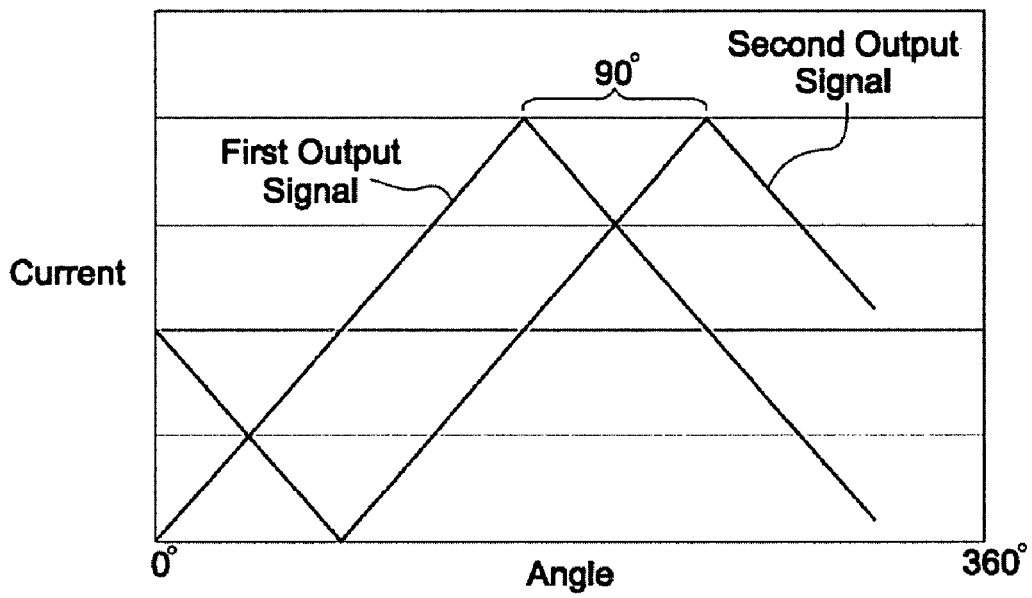
FIGS. 16(a) and 16(b) illustrate representative output signals provided by the light detecting and sensing systems of sub-modules 5 according to some embodiments.
Figure 16B:
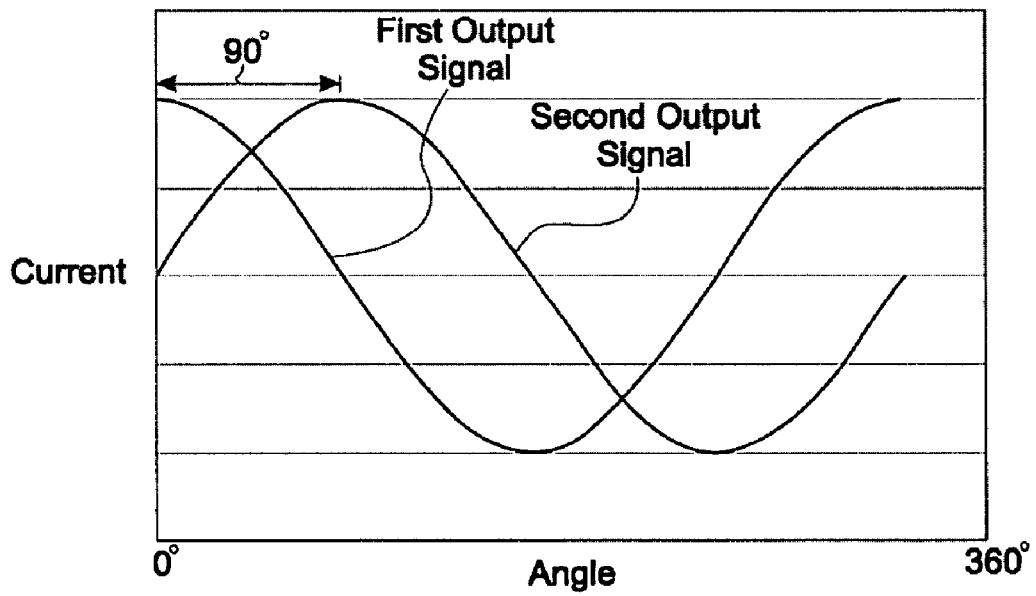
Figure 17:
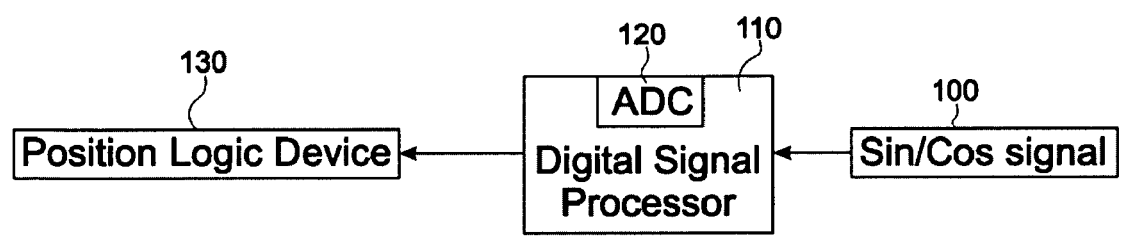
FIG. 17 shows one embodiment of a block diagram of a reflective multi-turn optical encoder.

Representative waveforms provided by light detectors 22 and 24 ninety degrees out of phase with respect to one another are shown in FIGS. 16(a) and 16(b). As further illustrated in FIG. 17, an analog-to-digital converter configured to convert the output signals provided by the light detectors and the circuitry associated therewith may also be employed in conjunction with a position logic device to provide a digital output signal representative of a shaft position and/or the number of revolutions the shaft has rotated.

As will now become apparent, the reflective multi-turn optical encoder disclosed herein has numerous advantages, including, but not limited to:

permitting optical encoders of smaller sizes and footprints to be provided;
permitting increased design flexibility in respect of the gear trains associated with optical encoders;
the ability to employ raw output signals provided during the course of a single revolution of a gear in a sub-module forming a portion of an optical encoder module to be converted into the absolute position of the gear;
enhanced flexibility for gear placement, which permits smaller encoder sizes or footprints to be achieved;
the use of single track patterns which permits smaller diameter code wheels and encoders to be employed;
increased flexibility in respect of placing reflective sensing sub-modules in upper and lower layers of gear trains in optical encoder modules;
increased flexibility to vary the number of bits provided by each gear, which can be accomplished, by way of example, by interpolating sinusoidal signals generated directly by the various light detectors;

enhanced flexibility to determine the number of total number of bits of resolution provided by an encoder module by locating sub-modules in different portions of the gear train;

lowering module costs by employing low-cost phototransistors or detectors in light detectors, or light detector, or by employing low-cost variable density code wheels 36;

reducing module costs by permitting single piece printed circuit board ("PCB") designs having a single active layer gear train;

providing structurally robust gear designs, improved gear reliability and enhanced gear and module dimensional control and stability.

Note that included within the scope of the present invention are methods of making and having made the various components, devices and systems described herein.

The above-described embodiments should be considered as examples of the present invention, rather than as limiting the scope of the invention. In addition to the foregoing embodiments of the invention, review of the detailed description and accompanying drawings will show that there are other embodiments of the invention. Accordingly, many combinations, permutations, variations and modifications of the foregoing embodiments of the invention not set forth explicitly herein will nevertheless fall within the scope of the invention.

We claim:

1. A reflective multi-turn optical encoder sub-module, comprising:
   a gear having an outer geared periphery and an upper surface having no apertures or holes disposed therethrough;
   a geared rotatable shaft attached to an underside of the gear;
   an optically reflective first area disposed on a first portion of the upper surface;
   an optically substantially non-reflective second area disposed on a second portion of the upper surface, and
   a substrate disposed above and opposing the upper surface, the substrate comprising a light emitter and first and second arrays of light detectors disposed and configured on the substrate such that first and second output signals provided by the first and second arrays of light detectors are out of phase with respect to one another by a predetermined phase difference;
   wherein the gear and the substrate are configured and arranged respecting one another such that at least portions of the light emitted by the light emitter and incident on the first area are reflected towards at least portions of the first and second arrays of light detectors for detection thereby as the gear and the substrate rotate in respect of one another, and at least portions of the light emitted by the light emitter and incident on the second area are substantially not reflected from the second area and are not detected by the first or second arrays of light detectors as the gear and the substrate rotate in respect of one another; and
   wherein the first array and second arrays of light detectors further comprise, respectively, concentric half-ring-shaped first inner and second outer pairs of light detectors.

2. The reflective multi-turn optical encoder sub-module of claim 1, wherein the phase difference is about 90 degrees.

3. The reflective multi-turn optical encoder sub-module of claim 1, wherein the first and second arrays of light detectors are arranged in first and second tracks disposed along first and second diameters corresponding to first and second radii.

4. The reflective multi-turn optical encoder sub-module of claim 1, wherein individual light detectors in the first and second arrays are configured to have different weights or sensitivities.

5. The reflective multi-turn optical encoder sub-module of claim 1, wherein the first area is disk-shaped.

6. The reflective multi-turn optical encoder sub-module of claim 1, further comprising a position logic device configured to determine an absolute position of or the number of revolutions turned by the shaft.

7. The reflective multi-turn optical encoder sub-module of claim 4, wherein at least portions of the first and second tracks overlap along common radii.

8. The reflective multi-turn optical encoder sub-module of claim 1, further comprising a digital signal processor operably configured to provide a digital output signal representative of a shaft position.

9. The reflective multi-turn optical encoder sub-module of claim 1, further comprising a digital signal processor configured to provide a digital output signal representative of the number of revolutions the shaft has rotated.

10. The reflective multi-turn optical encoder sub-module of claim 1, wherein the sub-module is mounted on or attached to one of a flexible circuit, a printed circuit board, and a ceramic substrate.

11. The reflective multi-turn optical encoder sub-module of claim 1, wherein the sub-module is integrated into and forms a portion of a reflective multi-turn optical encoder module comprising a plurality of reflective multi-turn optical encoder sub-modules.

12. A reflective multi-turn optical encoder sub-module, comprising:
   a gear having an outer geared periphery and an upper surface having no apertures or holes disposed therethrough;
   a geared rotatable shaft attached to an underside of the gear;
   an optically reflective first area disposed on a first portion of the upper surface;
   an optically substantially non-reflective second area disposed on a second portion of the upper surface, and
   a stacked die substrate disposed above and opposing the upper surface, the substrate comprising a light emitter and having first and second arrays of light detectors disposed and configured thereon such that first and second output signals provided by the first and second arrays of light detectors are out of phase with respect to one another by a predetermined phase difference;
   wherein the gear and the substrate are configured and arranged respecting one another such that at least portions of the light emitted by the light emitter and incident on the first area are reflected towards at least portions of the first and second arrays of light detectors for detection thereby as the gear and the substrate rotate in respect of one another, and at least portions of the light emitted by the light emitter and incident on the second area are substantially not reflected from the second area and are not detected by the first and second arrays of light detectors as the gear and the substrate rotate in respect of one another; and
   wherein the first array and second arrays of light detectors further comprise, respectively, concentric half-ring-shaped first inner and second outer pairs of light detectors.

13. The reflective multi-turn optical encoder sub-module of claim 12, wherein the phase difference is about 90 degrees.

14. The reflective multi-turn optical encoder sub-module of claim 12, wherein individual light detectors in the first and second arrays are configured to have different weights or sensitivities.

15. The reflective multi-turn optical encoder sub-module of claim 12, further comprising a position logic device configured to determine an absolute position of or the number of revolutions turned by the shaft.

16. The reflective multi-turn optical encoder sub-module of claim 12, further comprising at least one amplifier configured to receive and amplify the first and second output signals.

17. The reflective multi-turn optical encoder sub-module of claim 12, further comprising a digital signal processor operably configured to provide a digital output signal representative of a shaft position.

18. The reflective multi-turn optical encoder sub-module of claim 12, further comprising a digital signal processor configured to provide a digital output signal representative of the number of revolutions the shaft has rotated.

19. The reflective multi-turn optical encoder sub-module of claim 12, wherein the sub-module is mounted on or attached to one of a flexible circuit, a printed circuit board, and a ceramic substrate.

20. The reflective multi-turn optical encoder sub-module of claim 12, wherein the sub-module is integrated into and forms a portion of a reflective multi-turn optical encoder module comprising a plurality of reflective multi-turn optical encoder sub-modules.

21. A reflective multi-turn optical encoder sub-module, comprising:
a gear having an outer geared periphery and an upper surface having no apertures or holes disposed therethrough;
a geared rotatable shaft attached to an underside of the gear;
an optically reflective variable tone density codewheel disposed on, in or near the upper surface, and
a substrate disposed above and opposing the upper surface, the substrate comprising a light emitter and at least first and second light detectors disposed and configured on the substrate such that first and second output signals provided thereby are out of phase with respect to one another by a predetermined phase difference;
wherein the gear and the substrate are configured and arranged respecting one another such that at least portions of the light emitted by the light emitter and incident on the optically reflective variable tone density codewheel are reflected therefrom towards the first and second light detectors for detection thereby as the gear and the substrate rotate in respect of one another; and
wherein the first and second light detectors further comprise, respectively, concentric half-ring-shaped first inner and second outer pairs of light detectors.

22. The reflective multi-turn optical encoder sub-module of claim 21, further comprising a position logic device configured to determine an absolute position of or the number of revolutions turned by the shaft.

23. The reflective multi-turn optical encoder sub-module of claim 21, further comprising at least one amplifier configured to receive and amplify the first and second output signals.

24. The reflective multi-turn optical encoder sub-module of claim 21, further comprising a digital signal processor operably configured to provide a digital output signal representative of a shaft position.

25. The reflective multi-turn optical encoder sub-module of claim 21, further comprising a digital signal processor configured to provide a digital output signal representative of the number of revolutions the shaft has rotated.

26. The reflective multi-turn optical encoder sub-module of claim 21, wherein the sub-module is mounted on or attached to one of a flexible circuit, a printed circuit board, and a ceramic substrate.

27. The reflective multi-turn optical encoder sub-module of claim 21, wherein the sub-module is integrated into and forms a portion of a reflective multi-turn optical encoder module comprising a plurality of reflective multi-turn optical encoder sub-modules.

* * * * *